(12) United States Patent
Slavens et al.

(10) Patent No.: US 10,301,967 B2
(45) Date of Patent: May 28, 2019

(54) INCIDENT TOLERANT TURBINE VANE GAP FLOW DISCOURAGEMENT

(71) Applicant: United Technologies Corporation, Farmington, CT (US)

(72) Inventors: Thomas N. Slavens, Vernon, CT (US); Steven Bruce Gautschi, Naugatuck, CT (US)

(73) Assignee: United Technologies Corporation, Farmington, CT (US)

( * ) Notice: Subject to any disclaimer, the term of this patent is extended or adjusted under 35 U.S.C. 154(b) by 457 days.

(21) Appl. No.: 15/028,468

(22) PCT Filed: Oct. 17, 2014

(86) PCT No.: PCT/US2014/061047
§ 371 (c)(1),
(2) Date: Apr. 11, 2016

(87) PCT Pub. No.: WO2015/061150
PCT Pub. Date: Apr. 30, 2015

(65) Prior Publication Data
US 2016/0251980 A1  Sep. 1, 2016

Related U.S. Application Data

(60) Provisional application No. 61/893,363, filed on Oct. 21, 2013.

(51) Int. Cl.
*F01D 5/20* (2006.01)
*F01D 25/12* (2006.01)
(Continued)

(52) U.S. Cl.
CPC .............. *F01D 25/12* (2013.01); *F01D 5/02* (2013.01); *F01D 5/12* (2013.01); *F01D 9/041* (2013.01);
(Continued)

(58) Field of Classification Search
CPC ... F01D 25/12; F01D 5/02; F01D 5/12; F01D 9/041; F01D 11/04; F01D 17/14;
(Continued)

(56) References Cited

U.S. PATENT DOCUMENTS 835,836 A * 11/1906 Schultz ................ F16J 15/4472
277/419
2,963,268 A * 12/1960 Paulson .................. F01D 5/225
277/414
(Continued)

FOREIGN PATENT DOCUMENTS

EP           0852285         8/2002
EP           2980365 A1 *    2/2016    ............. F01D 9/041
JP           2011-196280 A   10/2011

OTHER PUBLICATIONS

International Search Report and Written Opinion for International Application No. PCT/US2014/061047 dated Jan. 26, 2015.
(Continued)

*Primary Examiner* — Jason D Shanske
*Assistant Examiner* — Brian Christopher Delrue
(74) *Attorney, Agent, or Firm* — Carlson, Gaskey & Olds P.C.

(57) ABSTRACT

A turbine vane assembly for a gas turbine engine is disclosed and includes an airfoil rotatable about a first axis transverse to an engine longitudinal axis. The airfoil includes an endwall and at least one protrusion disposed on the endwall configured for obstructing flow through a gap between the endwall and a static structure of the gas turbine engine.

17 Claims, 6 Drawing Sheets

(51) Int. Cl.
| | |
|---|---|
| *F01D 17/16* | (2006.01) |
| *F01D 5/02* | (2006.01) |
| *F01D 5/12* | (2006.01) |
| *F01D 9/04* | (2006.01) |
| *F01D 17/14* | (2006.01) |
| *F02C 3/04* | (2006.01) |
| *F01D 11/04* | (2006.01) |
| *F16J 15/00* | (2006.01) |
| *F01D 11/00* | (2006.01) |

(52) U.S. Cl.
CPC .............. *F01D 11/04* (2013.01); *F01D 17/14* (2013.01); *F01D 17/162* (2013.01); *F02C 3/04* (2013.01); *F16J 15/00* (2013.01); *F01D 11/001* (2013.01); *F05D 2220/32* (2013.01); *F05D 2240/35* (2013.01); *F05D 2250/182* (2013.01); *F05D 2250/183* (2013.01); *F05D 2250/184* (2013.01); *F05D 2260/20* (2013.01)

(58) Field of Classification Search
CPC .... F01D 17/162; F01D 11/001; F01D 11/005; F01D 11/02; F01D 11/025; F01D 11/08; F01D 11/10; F01D 5/20; F02C 3/04; F16J 15/00; F05D 2220/32; F05D 2240/35; F05D 2250/182; F05D 2250/183; F05D 2250/184; F05D 2260/20; F05D 2240/55; F04D 29/164; F04D 27/002; F04D 27/0246; F04D 29/083; F05B 2240/57
USPC ..................... 415/116, 173.5, 174.5
See application file for complete search history.

(56) References Cited

U.S. PATENT DOCUMENTS

| | | | | |
|---|---|---|---|---|
| 3,645,645 A * | 2/1972 | Gammill | ............... | F01D 11/005 415/117 |
| 3,701,536 A * | 10/1972 | Matthews | ............... | F16J 15/445 277/415 |
| 3,885,886 A * | 5/1975 | Richter | ................... | F01D 5/187 415/109 |
| 4,227,703 A * | 10/1980 | Stalker | ...................... | F01D 5/20 277/415 |
| 4,346,904 A * | 8/1982 | Watkins, Jr. | .............. | B32B 3/12 277/414 |
| 4,738,586 A * | 4/1988 | Harter | ...................... | F01D 5/20 415/173.5 |
| 4,861,228 A | 8/1989 | Todman | | |
| 4,884,820 A * | 12/1989 | Jackson | ................... | C21D 1/09 277/415 |
| 5,184,459 A | 2/1993 | McAndrews | | |
| 5,538,393 A | 7/1996 | Thompson et al. | | |
| 5,622,473 A | 4/1997 | Payling | | |
| 5,649,806 A | 7/1997 | Scricca et al. | | |
| 5,752,802 A * | 5/1998 | Jones | ........................ | F01D 5/20 415/170.1 |
| 5,941,685 A * | 8/1999 | Bagepalli | ................ | F01D 5/225 277/355 |
| 6,030,175 A * | 2/2000 | Bagepalli | ............ | F16J 15/3288 277/355 |
| 6,206,642 B1 * | 3/2001 | Matheny | ................. | F01D 5/147 415/173.3 |
| 6,340,284 B1 * | 1/2002 | Beeck | ..................... | F01D 5/187 415/115 |
| 6,350,102 B1 * | 2/2002 | Bailey | ....................... | F01D 5/20 415/173.5 |
| 6,722,850 B2 * | 4/2004 | Burdgick | .............. | F01D 11/003 277/416 |
| 7,665,961 B2 | 2/2010 | Lutjen et al. | | |
| 8,007,229 B2 * | 8/2011 | McCaffrey | ............. | F01D 9/041 29/889.22 |
| 8,105,019 B2 * | 1/2012 | McCaffrey | ................ | F02C 9/22 415/160 |
| 8,360,712 B2 * | 1/2013 | Deo | ........................ | F01D 11/02 415/1 |
| 8,439,634 B1 | 5/2013 | Liang | | |
| 8,540,487 B2 * | 9/2013 | Bottome | ................. | F01D 11/22 416/174 |
| 8,632,309 B2 * | 1/2014 | Tsypkaykin | ............ | F01D 5/225 415/173.5 |
| 9,771,870 B2 * | 9/2017 | Dierksmeier | ........... | F01D 5/085 |
| 9,932,847 B2 * | 4/2018 | Boeck | ..................... | F01D 9/041 |
| 2004/0240990 A1 | 12/2004 | Rockley | | |
| 2005/0091849 A1 | 5/2005 | Brooks | | |
| 2008/0025841 A1 * | 1/2008 | Norton | .................... | F01D 5/225 416/191 |
| 2008/0038116 A1 * | 2/2008 | Zemitis | ................... | F01D 5/225 416/191 |
| 2009/0072487 A1 * | 3/2009 | Chougule | ............. | F01D 11/001 277/412 |
| 2009/0074563 A1 * | 3/2009 | McCaffrey | ............. | F01D 11/08 415/115 |
| 2009/0148282 A1 * | 6/2009 | McCaffrey | ............ | F01D 17/162 415/208.2 |
| 2011/0070074 A1 * | 3/2011 | Schabowski | ............ | F01D 11/08 415/174.5 |
| 2011/0268561 A1 * | 11/2011 | Blanchard | ............... | F01D 5/282 415/174.4 |
| 2012/0134786 A1 * | 5/2012 | Cairo | .................... | F04D 29/023 415/173.4 |
| 2013/0084168 A1 * | 4/2013 | Babu | ....................... | F01D 5/225 415/173.5 |
| 2013/0195633 A1 * | 8/2013 | Hildebrand | ............... | F01D 5/20 415/173.4 |
| 2013/0236298 A1 * | 9/2013 | Chouhan | .................. | F01D 11/02 415/173.5 |
| 2015/0003963 A1 * | 1/2015 | Taketa | ...................... | F01D 5/28 415/115 |
| 2015/0086343 A1 * | 3/2015 | Rizzo | .................... | F04D 29/102 415/173.5 |
| 2015/0369058 A1 * | 12/2015 | Negri | ..................... | F01D 5/225 416/241 R |
| 2016/0010560 A1 * | 1/2016 | Dierksmeier | ........... | F01D 5/085 60/772 |
| 2016/0032748 A1 * | 2/2016 | Boeck | ..................... | F01D 9/041 415/115 |

OTHER PUBLICATIONS

European Search Report for EP Application No. 14856181.4 dated Oct. 27, 2017.
International Preliminary Report on Patentability for International Application No. PCT/US2014/061047 dated May 6, 2016.

* cited by examiner

INCIDENT TOLERANT TURBINE VANE GAP FLOW DISCOURAGEMENT

CROSS REFERENCE TO RELATED APPLICATION

This application claim priority to U.S. Provisional Application No. 61/893,363 filed on Oct. 21, 2013.

STATEMENT REGARDING FEDERALLY SPONSORED RESEARCH OR DEVELOPMENT

The subject of this disclosure was made with government support under Contract No.: N00014-09-D-0821-0006 awarded by the United States Navy. The government therefore may have certain rights in the disclosed subject matter.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Additional engine efficiencies are realized with variable turbine vanes that provide for variation in the flow of gas flow to improve fuel efficiency during operation. Gaps between the root and tip of such variable vanes may allow some gas flow around an airfoil and therefore reduce efficiency gains. Moreover, gas flow within the turbine section is at elevated temperatures and therefore gas flow over a tip or root portion can increase airfoil temperatures.

Turbine engine manufacturers continue to seek further improvements to engine performance including improvements to thermal, transfer and propulsive efficiencies.

SUMMARY

A turbine vane assembly for a gas turbine engine according to an exemplary embodiment of this disclosure, among other possible things includes an airfoil rotatable about a first axis transverse to an engine longitudinal axis. The airfoil includes an endwall. At least one protrusion disposed on the endwall is configured for obstructing flow through a gap between the endwall and a static structure of the gas turbine engine.

In a further embodiment of any of the foregoing turbine vane assemblies, the at least one protrusion includes a plurality of protrusions.

In a further embodiment of any of the foregoing turbine vane assemblies, the at least one protrusion includes a saw-tooth pattern on the endwall.

In a further embodiment of any of the foregoing turbine vane assemblies, the at least one protrusion varies in a distance from edge of the endwall in a chord-wise direction of the airfoil.

In a further embodiment of any of the foregoing turbine vane assemblies, the plurality of protrusions vary sinusoidally in a chord-wise direction of the airfoil.

In a further embodiment of any of the foregoing turbine vane assemblies, a sinusoidal frequency of the protrusions increases in a direction across the endwall.

In a further embodiment of any of the foregoing turbine vane assemblies, a sinusoidal frequency of the protrusions decreases in a direction across the endwall.

In a further embodiment of any of the foregoing turbine vane assemblies, at least one of the plurality of protrusions is disposed normal to a flow of gases through the gap for any position of the airfoil about the first axis.

In a further embodiment of any of the foregoing turbine vane assemblies, includes a cooling slot defined within the endwall for communicating cooling airflow into a gap between the endwall and a static structure of the gas turbine engine.

In a further embodiment of any of the foregoing turbine vane assemblies, the cooling slot is defined along a leading edge region of the endwall.

In a further embodiment of any of the foregoing turbine vane assemblies, the endwall includes an outer end wall and an inner endwall.

In a further embodiment of any of the foregoing turbine vane assemblies, the at least one protrusion includes an integral part of the endwall.

In a further embodiment of any of the foregoing turbine vane assemblies, the at least one protrusion includes a separate part attached to the endwall.

A turbine section of a gas turbine engine according to an exemplary embodiment of this disclosure, among other possible things includes at least one rotor supporting rotation of a plurality of blades about an engine axis. At least one vane assembly includes an airfoil rotatable about a first axis transverse to an engine axis. The airfoil includes an endwall. At least one protrusion is disposed on the endwall configured for obstructing flow through a gap between the endwall and a static structure.

In a further embodiment of any of the foregoing turbine sections, the at least one protrusion includes a plurality of protrusions.

In a further embodiment of any of the foregoing turbine sections, at least one of the plurality of protrusions is disposed normal to a flow of gases through the gap for any position of the airfoil about the first axis.

In a further embodiment of any of the foregoing turbine sections, includes a cooling slot defined along a leading edge of the endwall for communicating cooling airflow into a gap between the endwall and a static structure of the turbine engine.

In a further embodiment of any of the foregoing turbine sections, the cooling slot is defined along a leading edge region of the endwall.

A variable cycle gas turbine engine according to an exemplary embodiment of this disclosure, among other possible things includes a compressor section. A combustor is in fluid communication with the compressor section. A turbine section is in fluid communication with the combustor. The turbine section includes at least one rotor supporting rotation of a plurality of blades about an engine axis. At least one variable vane is rotatable about an axis transverse to the engine axis for varying a direction of airflow. The at least one vane includes an endwall. At least one protrusion is disposed on the endwall configured for obstructing flow through a gap between the endwall and a static structure.

In a further embodiment of any of the foregoing variable cycle gas turbine engines, includes a cooling slot defined along a leading edge of the endwall for communicating cooling airflow into a gap between the endwall and a static structure of the turbine engine.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
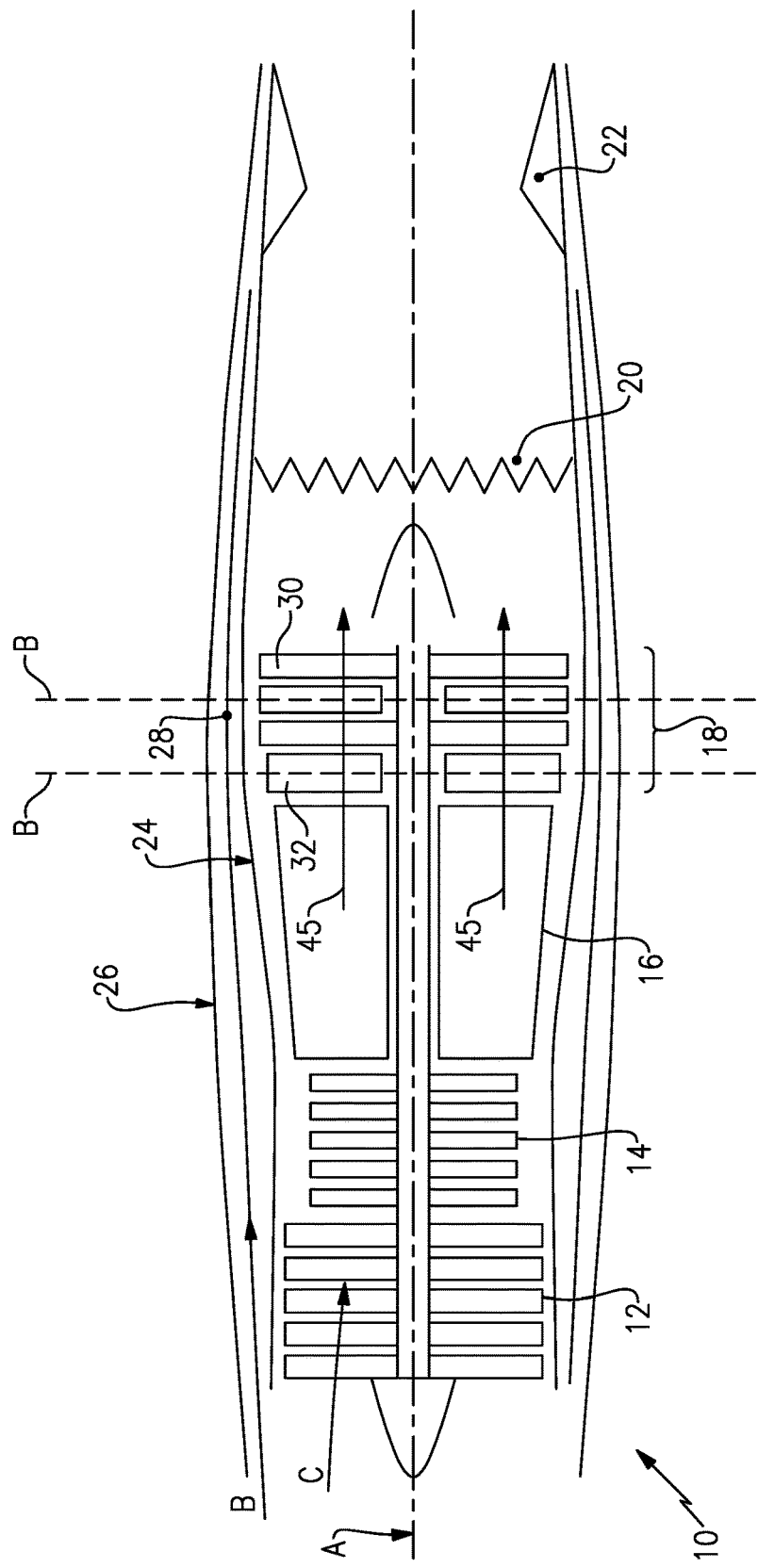
FIG. 1 is a schematic view of an example gas turbine engine.

FIG. 1 schematically illustrates a gas turbine engine 10. The example gas turbine engine 10 is a two-spool turbofan that generally includes a fan section 12, a compressor section 14, a combustor section 16 and a turbine section 18. The example engine 10 includes an augmentor section 20 and a nozzle 22 to increase thrust.

The fan section 12 drives air along a bypass flow path 28 in a bypass duct 26. A compressor section 14 drives air along a core flow path C into the combustor section 16 where fuel is mixed with the compressed air and ignited to produce a high energy exhaust gas flow 46. The high energy exhaust gas flow 45 expands through the turbine section 18 to drive the fan section 12 and the compressor section 14. Although depicted as a two-spool turbofan gas turbine engine 10 in the disclosed non-limiting embodiment, it should be understood that the concepts described herein are not limited to use with two-spool turbofans as the teachings may be applied to other types of turbine engines including three-spool architectures.

In this example, the gas turbine engine 10 includes a liner 24 that surrounds a core engine portion including the compressor section 14, combustor 16 and turbine section 18. The duct 26 is disposed radially outside of the liner 24 to define the bypass flow path 28. Air flow is divided between the core engine where it is compressed and mixed with fuel and ignited to generate the high energy combustion gases 45 and bypass air flow B that is bypassed through the bypass passage 28.

Figure 2:
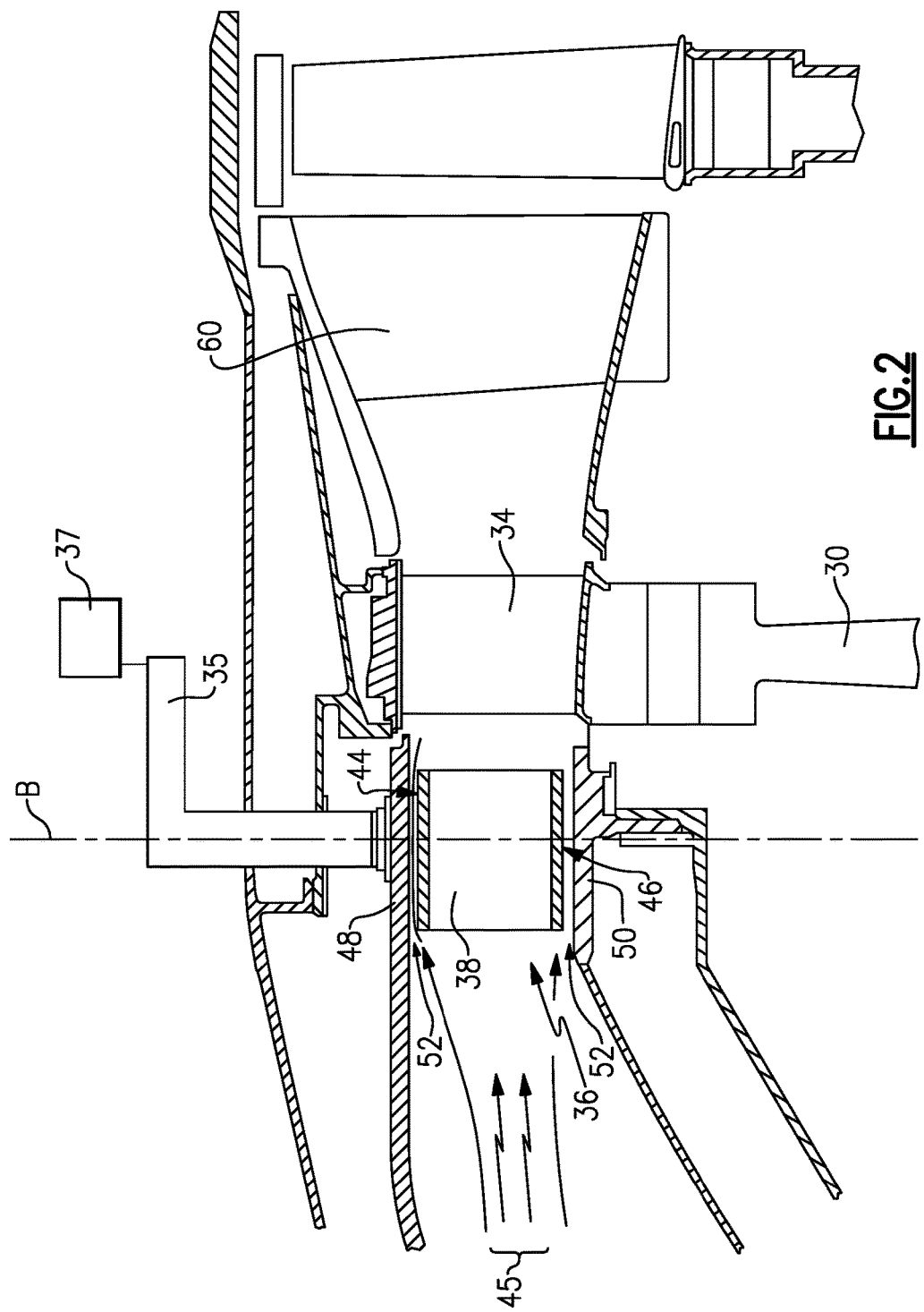
FIG. 2 is a cross-sectional view of a turbine section of the example gas turbine engine.

Referring to FIG. 2 with continued reference to FIG. 1, the example turbine section 18 includes rotors 30 that support turbine blades 34 that convert the high energy gas flow to shaft power that drives the fan section 12 and the compressor section 14. In this example, stator vanes 32 are disposed between the rotating turbine rotors 30 and are variable to adjust how the high energy gas flow 45 is directed through the turbine section 18.

The example gas turbine engine 10 is a variable cycle engine that includes a variable vane assembly 36 for adjusting operation of the engine to optimize efficiency based on current operating conditions. The variable vane assembly 36 includes airfoils 38 that are rotatable about an axis B transverse to the engine longitudinal axis A. The variable vane assembly 36 includes a plurality of airfoils 38 orientated circumferentially about the engine longitudinal axis A. The variable vane assembly 36 may include all variable vanes, or be interspersed between fixed vanes. Adjustment and rotation about the axis B of each of the airfoils 38 varies gas flow direction to further optimize engine performance between a high powered condition and partial power requirements, such as may be utilized during cruise operation.

The rotor 30 that supports turbine blades 34 and a fixed vane 60 is provided along with the variable vane assembly 36. The variable vane assembly 36 includes the airfoil 38 and is rotatable about the axis B. The example variable vane assembly 36 includes a mechanical link 35 that is attached to an actuator 37. The actuator 37 is controlled to change an angle of incidence of the airfoil 38 relative to the incoming high energy gas flow 46.

Figure 3:
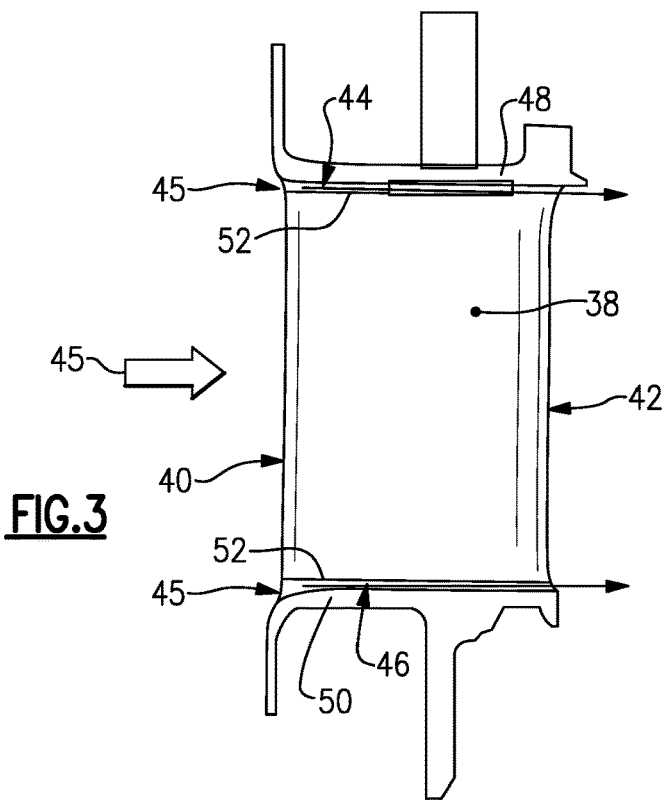
FIG. 3 is side view of an example variable turbine vane assembly.

Referring to FIG. 3, with continued reference to FIGS. 1 and 2, the example variable vane assembly 36 is supported within a static structure that includes an inner housing 50 and an outer housing 48. A gap 52 is defined between end walls 44, 46 of the airfoil 38 and the corresponding inner and outer housings 50, 48. The gaps 52 are required to provide rotational clearances between the rotating airfoil 38 and the static housings 48, 50. The airfoil 38 includes a leading edge 40 and a trailing edge 42 that extends between the end walls 44, 46.

The hot gas flow 45 through the gaps 52 between the outer and inner end walls 44, 46 not only reduces overall efficiency, but may also generate a high heat load. The high heat load is due to the increased area of the end walls along with the high heat transfer loads present within the gaps 52. The engine efficiency is degraded by the leakage flows through the gaps 52 as the high energy exhaust gases 45 bypass around the airfoil 38.

Figure 4:
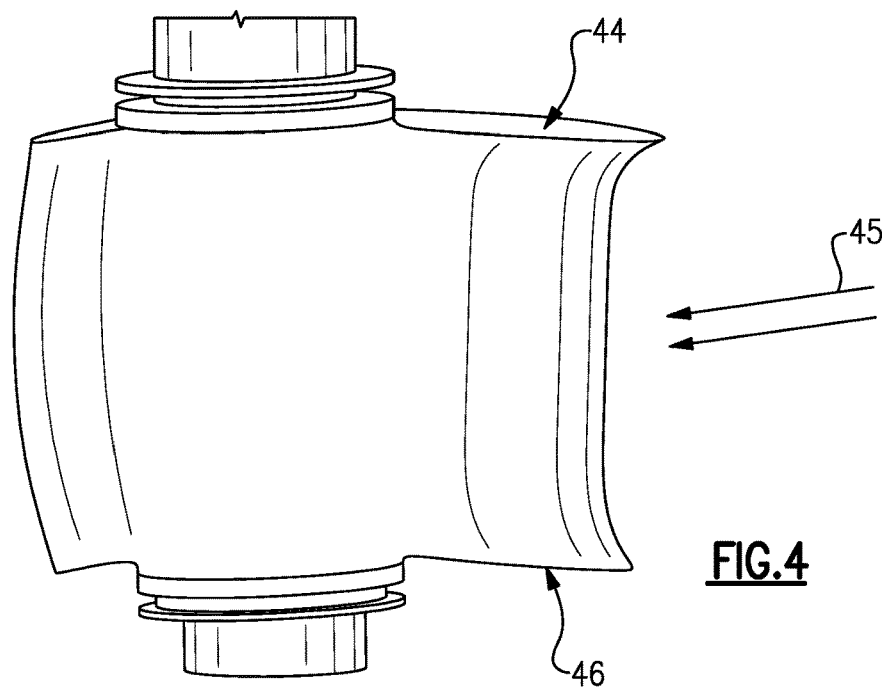
FIG. 4 is another side view of the example variable turbine vane assembly.
Figure 5:
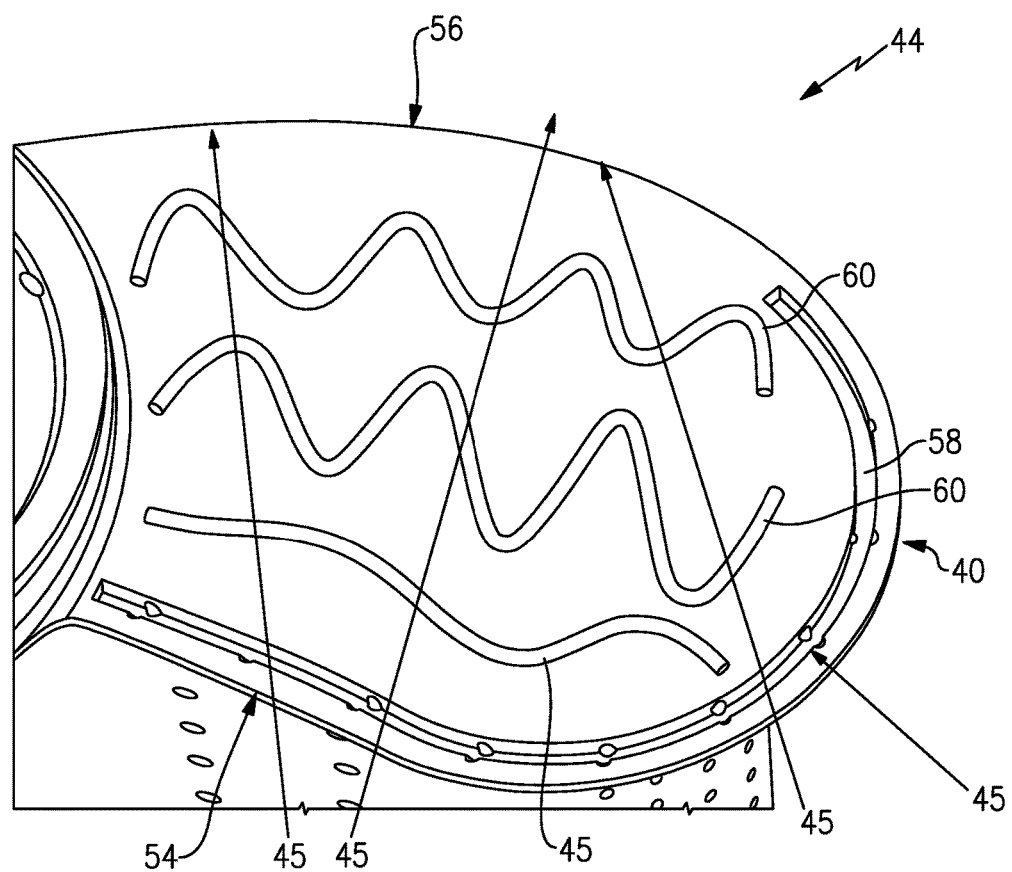
FIG. 5 is a top view of an end wall of the example variable turbine vane assembly.

Referring to FIGS. 4 and 5, the end walls 44, 46 each include a cooling air slot 58 and protrusions 60. The cooling air slot 58 is a hole fed cooling opening through which cooling air is communicated into the gap 52. The cooling air slot 58 is disposed on the end wall 44 near the leading edge 40 such that hot gas flow 45 initially passes over the cooling air slot 58. The introduction of cooling air flow from the cooling air slot 58 ensures that the overall temperature within the gap 52 is reduced so that the end walls 44, 46 can be effectively cooled. The gas flow 45 in the disclosed example flows past a pressure side 54 and a suction side 56 of the airfoil 38.

The protrusions 60 are provided downstream of the cooling air slot 58 and provide a significant pressure drop between sides 54, 56 of the airfoil 38 across the end wall 44. The protrusions 60 generate secondary vortices that provide flowpath flow discouragement within the gap 52. Accordingly, the protrusions 60 and the cooing air slot 58 introduce a cooling air flow discouraging arrangement for the variable vane assembly 36. The hole fed cooling air flow slot 58 that traverses the leading edge 40 of the end walls 44, 46 along with the protrusions reduce the overall temperature within the gaps 52.

The protrusions 60 are arranged in generally parallel rows transverse to a direction of flow across the end walls 44, 46. The protrusions 60 are set in a pattern that prevents the formation of any clear path across the endwalls 44, 46 for any rotational position of the airfoils 38. Accordingly, for any rotational position of the airfoil 38, at least two protrusions are set in an orientation that is transverse to the flow of hot gases 4645.

Figure 7:
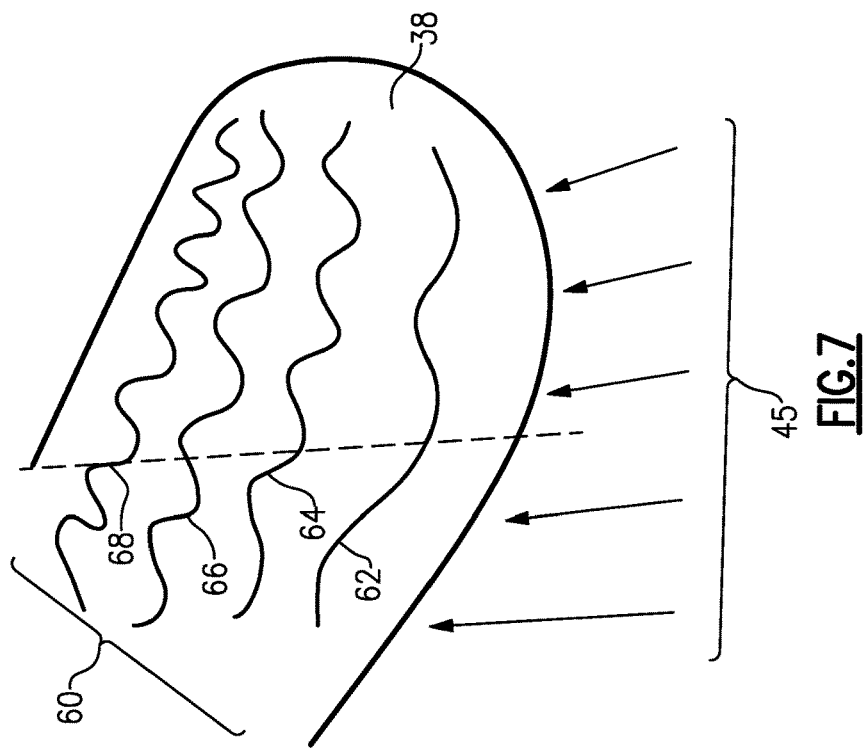
FIG. 7 is a schematic view of the example protrusion configuration on the endwall of the example variable vane assembly in a second position.
Figure 6:
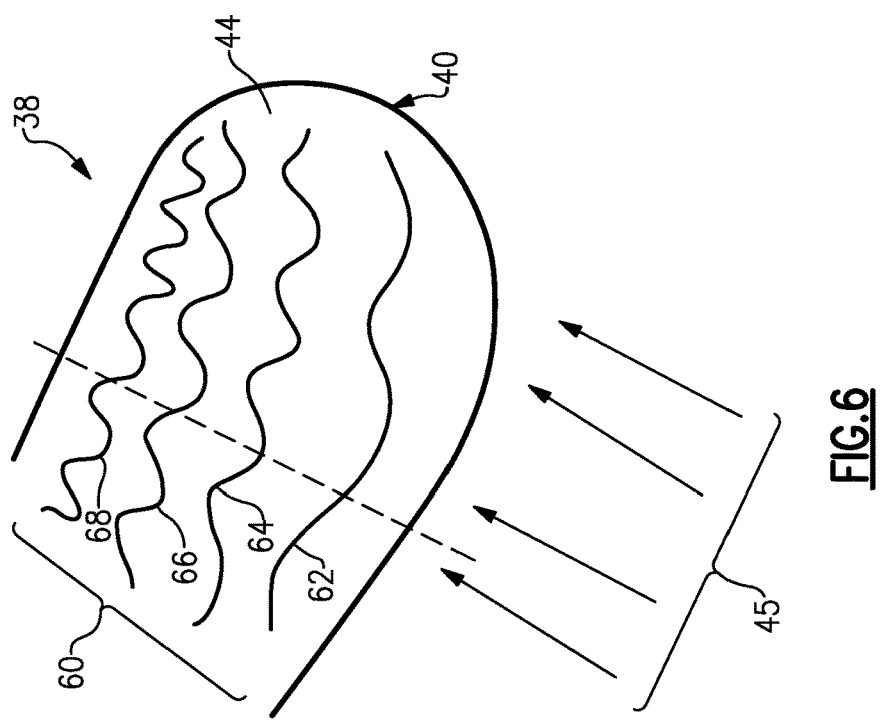
FIG. 6 is a schematic view of an example protrusion configuration on the end wall of the example variable vane assembly in a first position.

Referring to FIGS. 6 and 7 with continued reference to FIG. 5, a first orientation of the airfoil 38 is shown in FIG. 6 with gas flow 45 flowing across the endwalls 44 in a first orientation. The rows of protrusions 60 include a first row 62 that includes a first sinusoidal curved shape. The first sinusoidal curved shape is a gentle curve with a low frequency. A second row 64 downstream of the first row 62 includes a second sinusoidal shape of an increased frequency that provides an increased number of high and low, or curved portions. A third row 66 includes a further increase in frequency compared to the previous rows, and a fourth row 68 includes yet another increase in frequency. The increasing sinusoidal frequency of the shape of each row of protrusions 60 provides for a configuration such that regardless of the orientation of the orientation of the airfoil 38, to the hot gas flow 45 at least two rows of protrusions are disposed nearly perpendicularly to the hot gas flow 45.

Accordingly, in a second orientation of the airfoil 38 shown in FIG. 7, regardless of a position of the airfoil 38, the hot gas flow 45 will be always be obstructed by at least two rows of protrusions 60. The change in airfoil 38 orientation relative to the hot gas flow 45 does not result in a direct passage across the end wall 44. Instead, the hot gas flow 45 is always disrupted by the protrusions 60.

Figure 8:
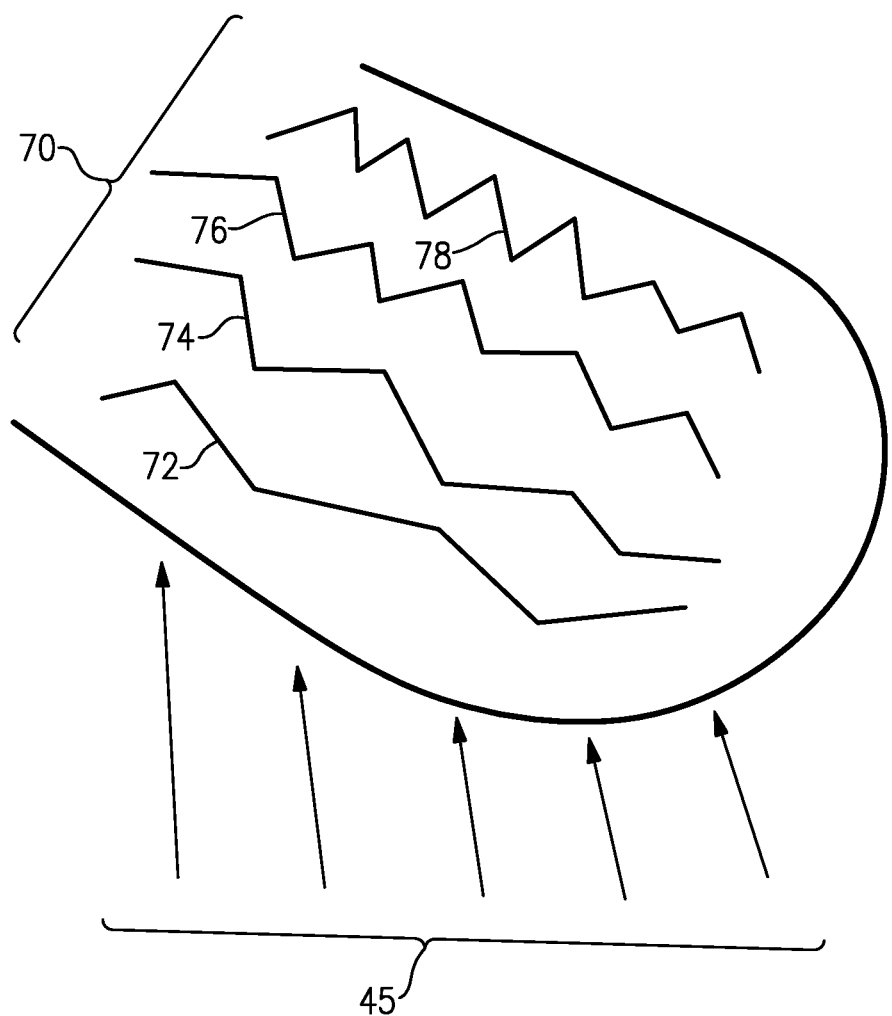
FIG. 8 is a schematic view of another protrusion configuration.

Referring to FIG. 8, another group of protrusions 70 include a saw tooth configuration with an increased number of peaks and valleys across the end wall in a direction common with the direction of the hot gas flow 45. In this example a first row 72 includes relatively few peaks and valleys, a second row 74 includes an increased number of peaks and valleys, a third row 76 includes even more, and the fourth row 78 includes the most peaks and valleys to provide for the increasing disruption of flow across the endwall 44.

The increased disruption prevents the increase in temperatures across the end walls. Accordingly, the example variable vane assembly 36 includes features that interrupt the flow of hot gas through inner and outer gaps around the airfoil 38 and maintain a desired temperature along the end walls 44, 46.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine vane assembly for a gas turbine engine comprising:
an airfoil rotatable about an axis transverse to an engine longitudinal axis, the airfoil includes an endwall; and
a plurality of rows of protrusions disposed on the endwall configured for obstructing flow through a gap between the endwall and a static structure of the gas turbine engine, wherein the plurality of rows of protrusions are spaced apart from each other across the end wall and a sinusoidal frequency of the plurality of rows of protrusions increases in a direction across the endwall.

2. The turbine vane assembly as recite in claim 1, wherein the plurality of rows of protrusions comprises a saw-tooth pattern on the endwall.

3. The turbine vane assembly as recited in claim 1, wherein the plurality of rows of protrusions varies in a distance from an edge of the endwall in a chord-wise direction of the airfoil.

4. The turbine vane assembly as recited in claim 1, wherein the plurality of rows of protrusions vary sinusoidally in a chord-wise direction of the airfoil.

5. The turbine vane assembly as recited in claim 1, wherein at least one of the plurality of rows of protrusions is disposed normal to a flow of gases through the gap for any position of the airfoil about the axis transverse to the engine longitudinal axis.

6. The turbine vane assembly as recited in claim 1, including a cooling slot defined within the endwall for communicating cooling airflow into a gap between the endwall and a static structure of the gas turbine engine.

7. The turbine vane assembly as recited in claim 6, wherein the cooling slot is defined along a leading edge region of the endwall.

8. The turbine vane assembly as recited in claim 1, wherein the endwall comprises an outer end wall and an inner endwall.

9. The turbine vane assembly as recited in claim 1, wherein the plurality of rows of protrusions comprise are an integral part of the endwall.

10. The turbine vane assembly as recited in claim 1, wherein the plurality of rows of protrusions comprises a separate part attached to the endwall.

11. A turbine vane assembly for a gas turbine engine comprising:
an airfoil rotatable about an axis transverse to an engine longitudinal axis, the airfoil includes an endwall; and
a plurality of rows of protrusions disposed on the endwall configured for obstructing flow through a gap between the endwall and a static structure of the gas turbine engine, wherein the plurality of rows of protrusions are spaced apart from each other in across the end wall and a sinusoidal frequency of the plurality of rows of protrusions decreases in a direction across the endwall.

12. A turbine section of a gas turbine engine comprising;
at least one rotor supporting rotation of a plurality of blades about an engine axis; and
at least one vane assembly including an airfoil rotatable about an axis transverse to an engine axis, the airfoil includes an endwall; and
a plurality of rows of protrusions disposed on the endwall configured for obstructing flow through a gap between the endwall and a static structure, wherein each of the plurality of rows of protrusions are spaced apart from each other across the endwall and a sinusoidal frequency of the plurality of rows of protrusions increases in a direction across the endwall.

13. The turbine section as recited in claim 12, wherein at least one of the plurality of rows of protrusions is disposed normal to a flow of gases through the gap for any position of the airfoil about the axis transverse to the engine longitudinal axis.

14. The turbine section as recited in claim 12, including a cooling slot defined along a leading edge of the endwall for communicating cooling airflow into a gap between the endwall and a static structure of the turbine engine.

15. The turbine section as recited in claim 14, wherein the cooling slot is defined along a leading edge region of the endwall.

16. A variable cycle gas turbine engine comprising:
a compressor section;
a combustor in fluid communication with the compressor section;
a turbine section in fluid communication with the combustor, the turbine section including at least one rotor supporting rotation of a plurality of blades about an engine axis, and at least one variable vane rotatable about an axis transverse to the engine axis for varying a direction of airflow, wherein the at least one vane includes an endwall, and a plurality of rows of protrusions disposed on the endwall configured for obstructing flow through a gap between the endwall and a static structure and the plurality of rows of protrusions include inusoidal patterns that are spaced apart from each other across the end wall and a sinusoidal frequency of the plurality of rows of protrusions increases in a direction across the endwall.

17. A variable cycle gas turbine engine as recited in claim 16, including a cooling slot defined along a leading edge of the endwall for communicating cooling airflow into a gap between the endwall and a static structure of the turbine engine.

* * * * *